US010233094B2

(12) United States Patent
Hurtado (10) Patent No.: US 10,233,094 B2
(45) Date of Patent: Mar. 19, 2019

(54) SYSTEM AND METHOD FOR DISTILLATION USING A CONDENSING PROBE AND RECYCLED HEAT

(71) Applicant: Arthur Francisco Hurtado, Riverside, CA (US)

(72) Inventor: Arthur Francisco Hurtado, Riverside, CA (US)

( * ) Notice: Subject to any disclaimer, the term of this patent is extended or adjusted under 35 U.S.C. 154(b) by 543 days.

(21) Appl. No.: 14/562,617

(22) Filed: Dec. 5, 2014

(65) Prior Publication Data

US 2015/0158740 A1    Jun. 11, 2015

Related U.S. Application Data

(60) Provisional application No. 61/963,472, filed on Dec. 6, 2013, provisional application No. 61/995,308, filed on Apr. 8, 2014, provisional application No. 62/071,542, filed on Sep. 29, 2014.

(51) Int. Cl.

| C02F 1/00 | (2006.01) |
|---|---|
| C02F 1/04 | (2006.01) |
| F25B 27/00 | (2006.01) |
| F01K 23/10 | (2006.01) |
| F01K 25/08 | (2006.01) |
| C02F 103/08 | (2006.01) |

(52) U.S. Cl.
CPC .............. *C02F 1/041* (2013.01); *F01K 23/10* (2013.01); *F01K 25/08* (2013.01); *F25B 27/005* (2013.01); *C02F 2103/08* (2013.01); *F25B 27/00* (2013.01); *Y02A 20/128* (2018.01)

(58) Field of Classification Search
CPC ....... C02F 1/041; C02F 2103/08; F25B 33/00
See application file for complete search history.

(56) References Cited

U.S. PATENT DOCUMENTS

| 4,779,427 A | 10/1988 | Rowley |
| 5,932,074 A * | 8/1999 | Hoiss ................... B01D 1/0047 203/10 |
| 6,804,962 B1 * | 10/2004 | Prueitt ................. B01D 1/0047 60/39.6 |
| 7,552,589 B2 * | 6/2009 | Mok ........................ F03D 1/04 126/683 |

(Continued)

FOREIGN PATENT DOCUMENTS

FR          2531418 A1 *  2/1984  ............... B01D 1/28

*Primary Examiner* — David J Teitelbaum (57) ABSTRACT

A system to distill seawater is disclosed. The system includes a condensing probe that serves to increase surface area and duration that heat is transferred. The system includes a first evaporator to receive seawater and boil the received seawater and produce a water vapor in addition to a boiler that contains a refrigerant R-410A. The system includes vertical blades placed across a bottom portion of the first evaporator, allowing precipitated salt to pass between the vertical blades and settle onto a tray located underneath the bottom of the evaporator. The tray is then compartmentalized as the vertical blades rotate horizontally and create a partition separating the tray from the seawater. The system includes a glass encasing that encapsulates the boiler wherein a vacuum is disposed within the glass encasing. The system includes a heating element coupled to a circulating fan to heat water vapor in the condenser.

15 Claims, 6 Drawing Sheets

(56) References Cited

U.S. PATENT DOCUMENTS

| | | |
|---|---|---|
| 8,539,772 B2 | 9/2013 | Hurtado |
| 2008/0083605 A1* | 4/2008 | Holtzapple ............. C02F 1/041 |
| | | 203/11 |
| 2014/0026573 A1* | 1/2014 | Palmer .................... F01K 9/003 |
| | | 60/649 |
| 2014/0102130 A1 | 4/2014 | Hurtado |

* cited by examiner

SYSTEM AND METHOD FOR DISTILLATION USING A CONDENSING PROBE AND RECYCLED HEAT

CROSS-REFERENCE TO RELATED APPLICATIONS

This application claims priority to U.S. Provisional Application No. 61/963,472 filed on Dec. 6, 2013, U.S. Provisional Application No. 61/995,308 filed on Apr. 8, 2014 and U.S. Provisional Application No. 62/071,542 filed on Sep. 29, 2014, and the respective disclosures are incorporated herein by reference to the extent that they do not conflict with the present application.

BACKGROUND OF THE INVENTION

1. Field of the Invention

The present invention relates generally to distillation systems and methods, and particularly to a low cost, energy-saving method and system for distilling, desalinating or purifying water.

2. Description of the Related Art

Distillation is well known process and involves heating a liquid until it boils into a gas-phase, then condensing the gas back into a liquid-phase and collecting the condensed gas. The heating of the liquid involves high energy consumption, which makes the distillation process expensive. What is needed is a new and improved distillation method and system that achieve the same results with a considerably less amount of energy.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter.

In one exemplary embodiment, the system to distill seawater with a condensing probe and recycled heat includes a compressor that is powered by an external motor or by energy derived from an expansion system. The compressor draws in water vapor from the boiling seawater contained in an evaporator and compresses the vapor to an elevated temperature into a condenser where it condenses into pure water. In this example, it is assumed that the starting temperature of the seawater in the evaporator is preheated to 212 F.° and the steam from the evaporator is compressed to a temperature of 222 F.°.

In another exemplary embodiment, the system to distill seawater with a condensing probe and recycled heat recycles the heat in the distillation process and reuses the heat to run the distillation process again, creating an energy loop. To help achieve this process, the condenser is placed within the evaporator so that the heat given-off by the condenser is absorbed by the boiling seawater in the evaporator. This is particularly important, in that the latent heat of condensation is absorbed by the latent heat of vaporization. The reabsorption of the latent heat back into the system greatly reduces the amount of external energy required to operate the distillation process. The latent heat of vaporization comprises the greatest portion of heat required to operate the distillation process. As an example, the latent heat of vaporization of water at 100 degrees C.° is approximately 540 cal./gm. However if this heat is recycled it would greatly decrease the amount of energy required to run the process.

In another exemplary embodiment the system to distill seawater with a condensing probe and recycled heat utilizes at a given pressure, seawater that boils at a slighter higher temperature than pure water. For example, at atmospheric pressure, pure water boils at 100 C and seawater boils at 102 C. For this reason the vapor emitted from the evaporator containing the boiling seawater is compressed to a higher temperature so that the water vapor may be directed back into the cooler evaporator and condensed. In this process, heat is returned and recycled back to the evaporator. In discussing the following embodiments and for simplification, it is assumed that distilled water and seawater have the same boiling point and the latent heat of vaporization is the same at a given temperature and pressure.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the present invention are illustrated in the figures of the accompanying drawings, in which.

DETAILED DESCRIPTION OF THE PREFERRED EMBODIMENTS

What follows is a detailed description of the preferred embodiments of the present invention in which the present invention may be practiced. Reference will be made to the attached drawings, and the information included in the drawings is part of this detailed description. The specific preferred embodiments of the present invention, which will be described herein, are presented for exemplification purposes, and not for limitation purposes. It should be understood that structural and/or logical modifications could be made by someone of ordinary skills in the art without departing from the scope and essence of the present invention.

Figure 1:
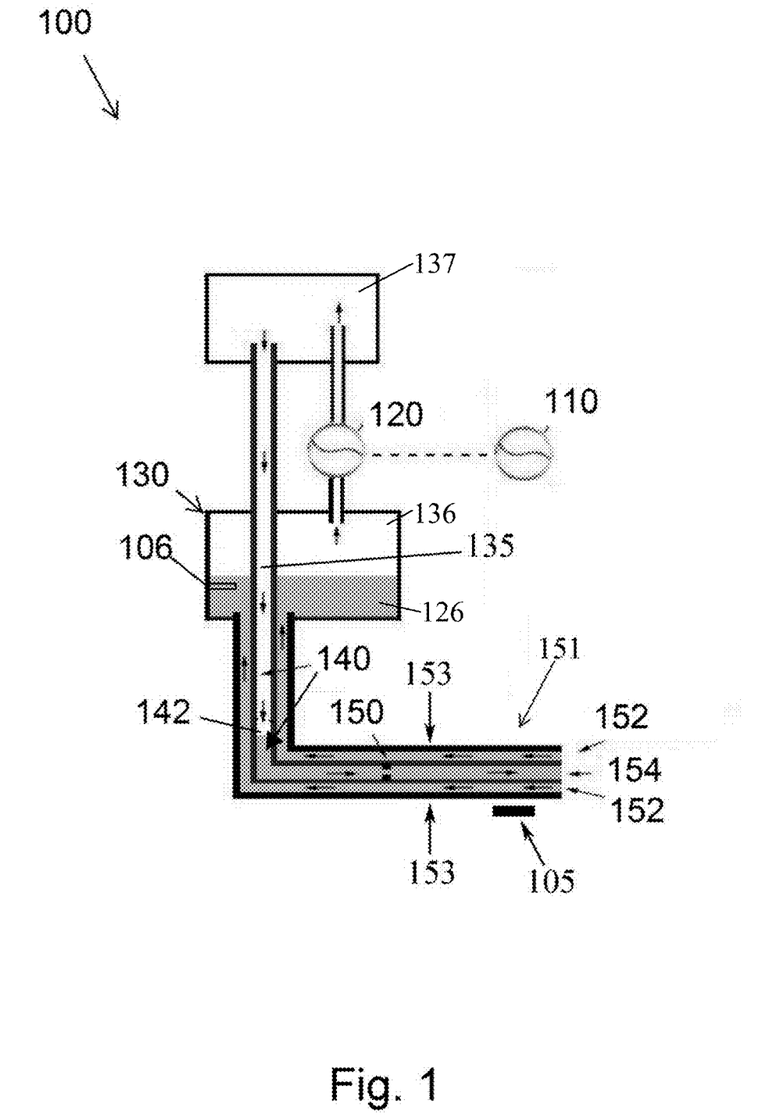
FIG. 1 illustrates a diagram of a distillation system, according to an embodiment.

FIG. 1 illustrates a diagram of a distillation system, according to an embodiment. As shown, the distillation system 100 having a condenser 135 immersed within the seawater 126 contained in evaporator 130 and in addition may have a condensing probe 140, an extension of condenser 135, that may be encircled by an outer pipe 153 containing incoming seawater 152, such that heat is transferred from the condensing probe 140 into the encircled seawater 152. Preferably, the condensing probe 140 is configured to increase the surface area and duration that heat is transferred from the high temperature steam 137 onto the incoming seawater 152. To this end, the condensing probe 140 depicted in FIG. 1 and described herein is only an example. Various other configurations may be adopted. For example a plurality of probes may be utilized to increase further the surface area and thus increase heat transfer. It is advantageous to insert the condensing probe 140 deep into the encircling seawater to insure early contact with the cool incoming seawater. In this regard the incoming seawater begins to absorb heat early on and by the time it reaches the evaporator 130, enough heat should have been absorbed and its temperature should have gradually risen to the level of the temperature of the seawater 126 boiling in the evaporator 130. A heat source 105, 305 may be applied to the incoming seawater 152, as necessary, to any point prior to reaching the area of the condensing probe 140 to ensure the seawater reaches the desired temperature as it enters the evaporator 130.

The highest temperature level of the seawater is in the evaporator 130 and the lowest temperature level is at the holding reservoir (FIG. 2, 230) as it enters the system. Hence the greatest rate of condensation within the condensing probe 140 occurs when the steam 137 initially comes in contact with the cool incoming seawater 152 and slowest rate of condensation occurs when the condensing probe 140 approximates the evaporator 130.

To some extent the early onset of condensation within the condensing probe 140 at the cooler regions of the incoming seawater, help decrease the pressure level within the condensing probe 140 and hence the work required by the compressor 120 to compress the vapor 136 from the evaporator 130 into the condenser 135. Since a portion of the steam 137 has condensed at the cooler regions of the incoming seawater, it has a suction effect on the vapor entering the condensing probe 140 from the compressor 120.

A form of circulation occurs as the incoming seawater 152 boils at the outer surface of the condensing probe 140 and bubbles ascend into the evaporator 130. This improves heat exchange and helps speed up the distillation rate.

Insulation may be applied to the distal portion and the tip 142 of the condensing probe 140, as necessary, to slow down and regulate the rate of heat transfer and avoid extreme temperature differentials between the high temperature of the steam 137 within the condensing probe 140 and the cool temperature of the incoming seawater 152, to prevent cracking or damage to the condensing probe 140 due to the extreme temperature differences.

A flow regulator 150 may be placed near the end of the outflow of the condensed water 154 to regulate the amount of steam 137 contained within the condensing probe 140 and the duration the steam 137 conducts heat into the inflow of seawater 152, thus regulating the rate of heat exchange into the incoming seawater 152 to assure and regulate the time duration for optimum heat transfer. Also, by regulating the outflow of condensed water 154, suitable pressure within the condensing probe 140 is maintained avoiding the temperature of the steam to drop below the temperature of the evaporator 130. If the pressure in the condensing probe 140 is higher than atmospheric pressure, the condensed water 154 should flow out as the flow regulator 150 releases.

Subsequent to the condensation of the steam 137, the outflow of condensed water 154 exiting the condensing probe 140 still contains usable heat capable of being recycled back to the system. A counter current heat exchange system 151 (FIG. 2, 200) may help recapture and recycle this heat back into the distillation system 100.

As the condensed water 154 and seawater 152 flow in opposite directions, heat from the condensed hot water 154 is gradually given-off to the surrounding incoming cooler seawater 152. Hence, the outflowing condensed water 154 becomes cooler. Conversely the inflowing seawater 152 becomes hotter as it absorbs heat and approaches the condensing probe 140 and ultimately the evaporator 130.

The compressor 120 may be actuated by an external motor 110 or by other means as it will be explained hereinafter when referring to FIGS. 3-4 for example. The compressor 120 draws in water vapor 136 from the boiling seawater contained in an evaporator 130 and compresses the vapor into a condenser 135 and further into a condensing probe 140 as shown, where it condenses into pure water.

Thus, it should be apparent that an important aspect is to recycle the heat in the distillation process and reuse the heat to run the distillation process again, creating an energy loop. To help achieve this process, the condenser 135 and/or the condensing probe 140 may be placed completely or partially (as shown in FIG. 1) within the evaporator 130 so that the heat given off by the condenser 135 is absorbed by the boiling seawater 126 in the evaporator. Any portions of the condenser 135 or condensing probe 140 not placed within the evaporator 130 or within a heat exchange system 151, would preferably need to be insulated such that to prevent heat loss by the distillation system 100. This is particularly important, in that this causes the latent heat of condensation to be absorbed by the latent heat of vaporization. The reabsorption of the latent heat back into the system greatly reduces the amount of external energy required to operate the distillation process. The latent heat of vaporization comprises the greatest portion of heat required to operate the distillation process. As an example, the latent heat of vaporization of water at 100 degrees C. is approximately 540 cal/gm. However, if this heat is recycled, rather than allowing the heat to escape into the environment, it would greatly decrease the amount of energy required to run the distillation system.

For the purpose of this discussion, for simplification, we are assuming that distilled water and seawater have the same boiling point and latent heat of vaporization at a given temperature and pressure. In this example, also for simplification, we are assuming that the starting temperature of the seawater 126 in the evaporator 130 is preheated to 212 Fahrenheit (F) and the steam 136 from the evaporator is compressed by compressor 120 to a temperature of 222 F. However, in -reality at a given pressure, seawater boils at a slighter higher temperature than pure water, (approximately 102 Celsius degree (216° F.) at sea level). For this reason, the steam 136 emitted from the evaporator 130 containing the boiling seawater 126 is compressed into a higher temperature (222 F) so that the steam 137 may be, as explained earlier, passed through the cooler evaporator 130 and condensed. In this process heat is returned and recycled back to the evaporator.

It should be understood that, the starting temperature of the evaporator 130, as well as any heat required to maintain its temperature due to heat loss of the system, may be provided by a heating source either through heating elements 106, solar energy or burning of fuels or other suitable means.

The preceding example pertains to distilling seawater to obtain pure water. However, any liquid, for example liquid chemicals used in industries, or unpurified water may be distilled using the system from FIG. 1, including that of treatment facilities, brackish water, etc.

Figure 2:
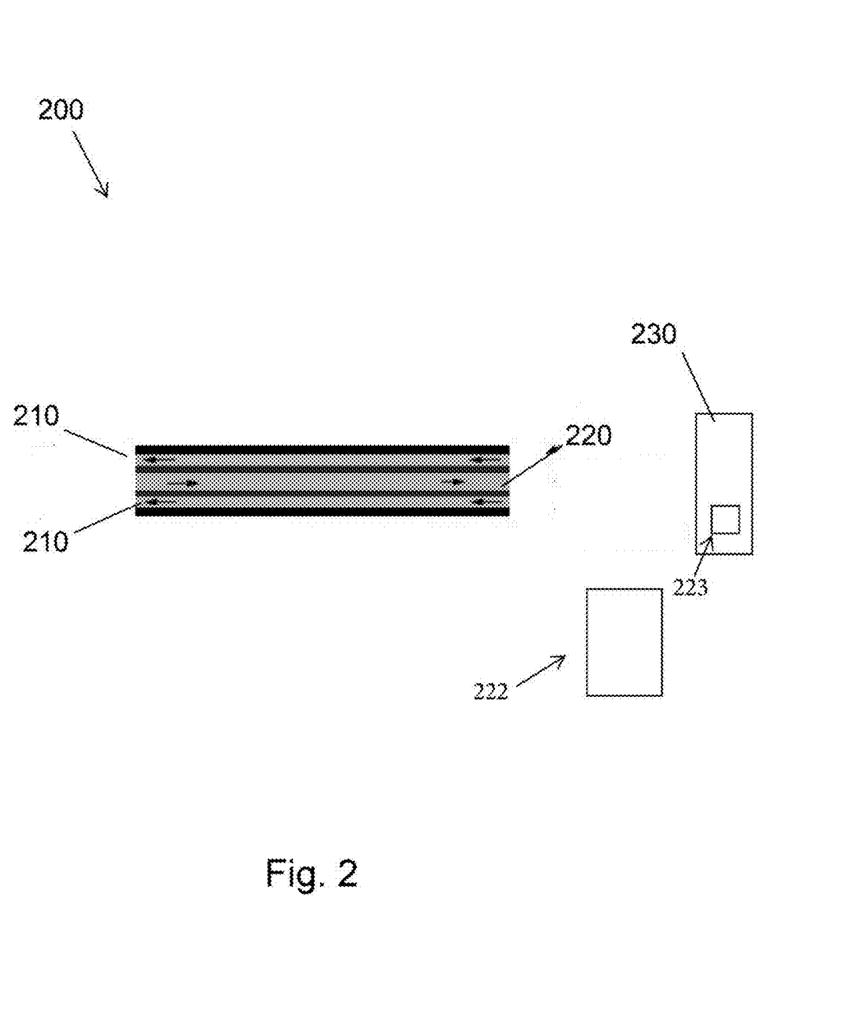
FIG. 2 illustrates a diagram of a counter current heat exchange system.

FIG. 2 illustrates a diagram of a counter current heat exchange system 200.

A complete heat exchange is difficult if not impossible. However, the goal is to come as close as possible to a complete heat exchange.

Toward the end of the outflow of the condensed water 220, the temperature of the condensed water 220 is the lowest and the heat absorption rate is the slowest. At this point, to optimize heat exchange, the condensed water 220 may be passed through coils or radiators, before it enters a condensed water holding tank 222. Furthermore, the outflowing condensed water 220 may be piped through and stored in container(s) 223 within the holding reservoir 230 containing the inflowing seawater, so that the last bit of the heat from the condensed water 220 is transferred to the sea water 210 therein. The storage containers 223 should be constructed of material that readily conducts heat.

Theoretically, if the counter current heat exchange 200 is long enough and insulated well to prevent heat loss, the condensed water 220 may give-off enough heat and its temperature reduced to be the same or close to the temperature of the incoming seawater 210 and the temperature of the incoming seawater 210 may absorb heat and its temperature increased to be the same or close to the temperature of the condensed water 220 leaving the condensing probe (FIG. 1, 140).

Expansive Section

Figure 3:
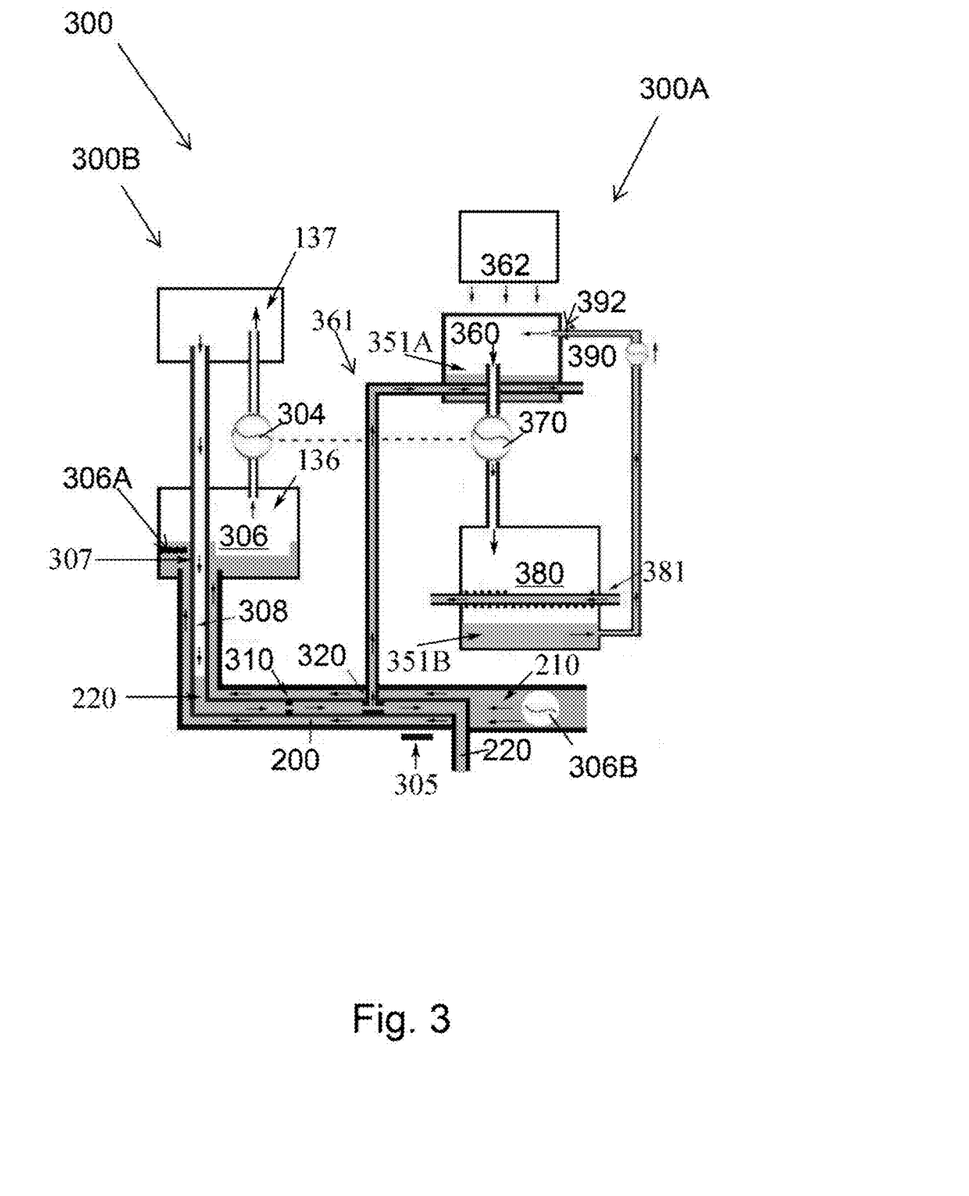
FIG. 3 illustrates a diagram of a distillation system having an expansive section as a source of energy to power the distillation system, according to an embodiment.

FIG. 3 illustrates a diagram of a distillation system having an expansive section as a source of energy to power the distillation system, replacing or augmenting motor 110, according to an embodiment.

An important aspect of the distillation system 300, FIG. 3, is the use of a fluid 351A, 351B in which the fluid 351A and fluid 351B may be a refrigerant, R-410A for example. In this example, refrigerant R-410A, 351A is in a gas-phase and liquid-phase mixture contained in an evaporator or a boiler 360, may absorbs heat from its surroundings causing the refrigerant 351A to boil. The increase in the refrigerant vapor 351A in the boiler 360 causes an increase in pressure. The pressurized refrigerant vapor 351A is preferably communicated from the boiler 360 through an expander 370 into condenser 380 where the gas-phase refrigerant 351A condenses into a liquid-phase 351B, resulting in a decrease in pressure in condenser 380. Heat may be expelled from condenser 380 into a cooler environment The expander 370 is placed between the high pressure of the boiler 360 and the low pressure of condenser 380. The expander 370 is preferably actuated by the difference in pressure between the boiler 360 and condenser 380 and the energy derived from the expander 370 is transferred to and actuates the compressor 304 of the compressive section 300B of the distillation system 300. The condensed liquid-phase refrigerant 351 B is preferably pumped from condenser 380 back into the boiler 360 via a pump 390.

The portion of the system from which energy is derived, including the boiler 360, expander 370 and condenser 380 is termed the expansive section 300A and the portion of the section in which the compressor 304 compresses vapor, including the evaporator 306, compressor 304, condenser 307 and the condensing probe 308 are termed the compressive section 300B.

An option for enhancing the vaporization of the liquid-phase refrigerant 351B, as it enters the boiler 360, is to pump the liquid-phase refrigerant 351B with sufficient force through an expansion valve 392 creating a spray of the refrigerant 351B. The sudden drop in pressure causes the refrigerant 351B droplets to vaporize more readily.

The heat source for the boiler 360 may preferably come from ambient temperatures or may be fortified by, for example, solar energy such as parabolic reflectors, reflective mirrors 362, solar panels or the like.

As previously discussed, the heat source for the evaporator 306/130 for providing the starting temperature and temperature maintenance of the seawater may be provided by a heating element 306A/106, solar energy, burning fuels or the like.

A pump 306B may be provided to increase the pressure of the incoming seawater into the evaporator 306 thus providing for higher boiling temperatures of the seawater. As it will be discussed later, greater yields of distilled water are achieved when the temperature of the seawater in the evaporator is at higher levels. This is due to the vapor concentration and saturation points becoming higher as the temperature of the water vapor increases. Together, in association with the compressor 304, the pump 306B and the outflow regulating valve 310 regulate and maintain the pressure and temperature of the evaporator 306 and the condensing probe 308. Pump 306B may also be used to increase heat exchange by circulating the seawater about the condensing probe 308. For example, a whirling motion of the seawater around the condensing probe 308 may be created by the implementation of pump 306B, or the like, having a dual role and acting as an impeller to circulate the seawater.

Another option of reutilizing heat is to divert a portion or all of the outflow of the condensed water 220, through piping 361, into the boiler 360 of the expansive section 300A. This is particularly useful at the end phase of the counter current heat exchange 200. At the end phase, the condensed water 220 is at a low temperature due to most of its heat having been given-off. Additionally, at this point there is a slow rate of heat exchange. Provided the temperature of the condensed water 220, diverted into piping 361, is high enough to cause the refrigerant 351 A to boil in the boiler 360, the low grade heat of the condensed water 220 will be absorbed by the latent heat of the boiling refrigerant 351 A. The absorption of heat, in this manner, is at a much faster rate than it would have been if the condensed water 220 would have ran its normal course and had exchanged its heat through ordinary conduction. Furthermore, the heat from the diverted condensed water 220 may be utilized by the boiler 360 as an energy source to help drive the expander 370. A 3-way valve 320 may regulate the portion of the condensed water 220 delivered to the boiler 360 of the expansive section 300A of the system. As an option, heat from condenser 135/307 may also be diverted through piping 361 to boiler 360 in the form of steam before it becomes condensed in condensing probe 140/308 or may be diverted in the form of condensed water 220 at any point along the counter current heat exchange system 151. In the instance where steam is diverted to boiler 360, the steam becomes condensed in boiler 360. In each instance whether the heat is derived from steam or condensed water, the heat given off is captured as an energy source by boiler 360 as refrigerant 351A expands during boiling and help drive the expander 370. It is noted that heat from condenser 307 either in form of steam 137 or condensed water 220 may be diverted through piping 361 into boiler 360 and bypassing either the condensing probe 308 or counter current heat exchange system 200 or both.

Piped cool ocean water 381 may be utilized to condense the refrigerant 351A in condenser 380 of the expansive section 300A of the system. Seawater of cooler temperatures may be obtained from the depths of the ocean, thus providing a greater temperature differential between the boiler 360 and condenser 380 and in turn a greater force exerted on the expander 370. As the piped ocean water 381 passes through condenser 380, heat is absorbed and transferred to the ocean water 381.

Yet another embodiment involving the recapturing of heat is to make use of the heated ocean water as it exits condenser 380. This embodiment includes piping the cool seawater 381 through the chamber of condenser 380. As refrigerant 351 A vapor becomes condensed, heat is transferred to the cool incoming piped seawater 380. As a result, the seawater 380 becomes pre-warmed and then may be stored in a holding reservoir (FIG. 2, 230) before it enters the counter current heat exchange system 200 and subsequently into the evaporator 306 of the compressive section 300B of the distillation system. The pre-warmed seawater may also enter the evaporator 306 directly bypassing the counter current heat exchange system 200.

Figure 4:
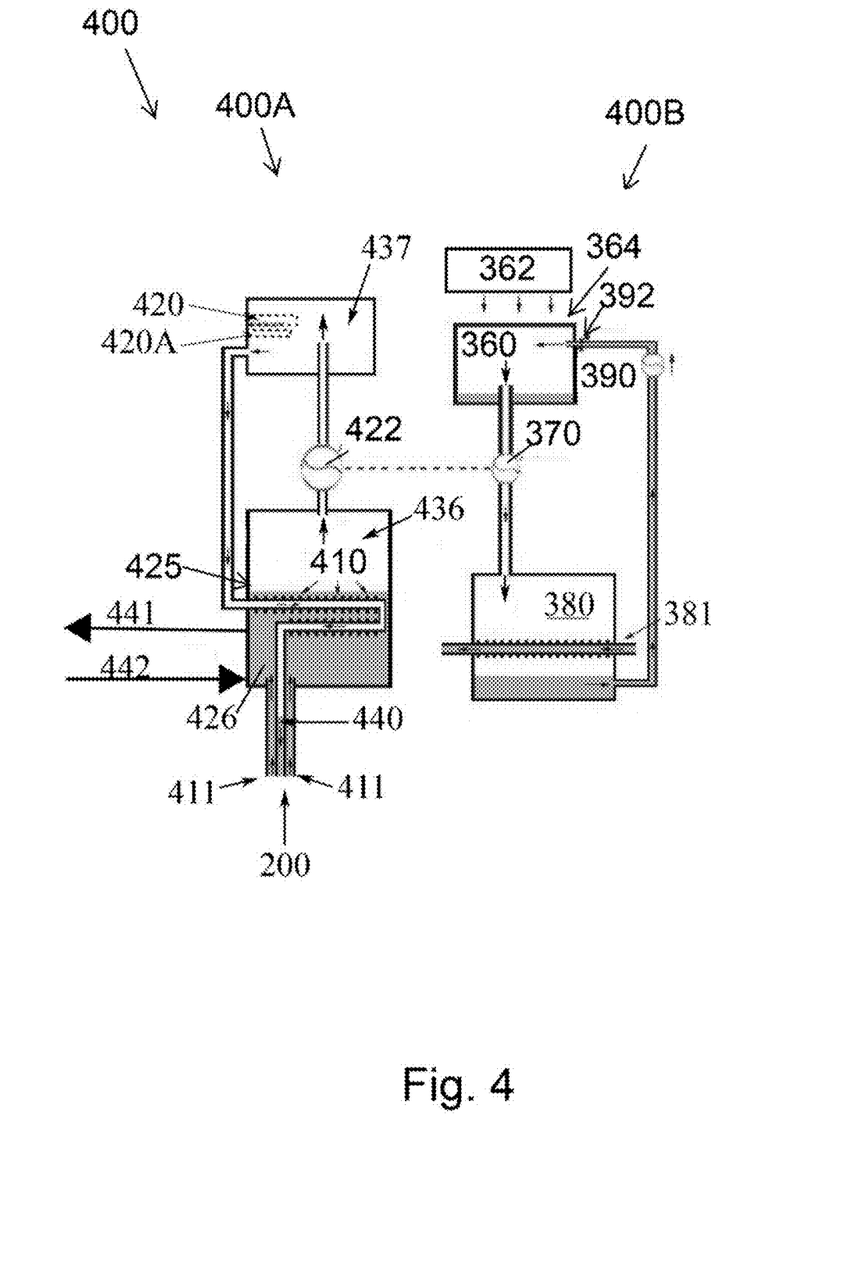
FIG. 4 illustrates a diagram of a distillation system having an expansive section as a source of energy to power the distillation system and a more elaborate condenser with an increased surface area, according to an embodiment.

FIG. 4 illustrates a diagram of a distillation system 400 having an expansive section 400B as a source of energy to power the distillation system and a more elaborate condenser 410 having an increased surface area, according to an embodiment.

The evaporator 425, receives seawater 411 from the counter current heat exchange system 200 and at this point (when entering the evaporator 425) the temperature level of the seawater 426 contained in evaporator 425 should be at or near the temperature of its boiling point. At this point the seawater 426 has initially reached its boiling point. However, the seawater 426 must still gain additional heat to overcome the latent heat requirement in order for it to boil. Since latent heat requires the greatest portion of heat in the distillation process, a condenser 410 filled with steam having a temperature greater than that of the seawater 426 from evaporator 426 as well as having an increased surface area is desirable.

For the purpose of simplification, the heat recycling element 361, shown in FIG. 3, regarding diverting the piped condensed hot water 220 or steam 137 from the counter current heat exchange system 200 has been omitted from the drawing of FIG. 4. However, all of the embodiments and elements of FIG. 3 may be incorporated into FIG. 4.

A heating source or element 420 coupled to a circulating fan 420A, similar to that of a hair dryer, may be placed inside the chamber leading to the condenser 410 to heat the steam 437 of the condenser 410 to assure the temperature of the steam 437 in the condenser 410 is adequately above the temperature of the evaporator 425. Less heat is required to heat the steam in the condenser 410 than it is to heat the liquid water in the evaporator 425. To raise the temperature of 1 Kg of steam by 1 C.° requires half the amount of heat to raise the same quantity of liquid water by 1 C.°.

Additionally there may be times when the seawater 426 within evaporator 425 may be heated by heating source 306A or heating incoming seawater 220 by source 305 prior to entering evaporator 425 to increase or maintain the temperature at a desired starting point or during times when the process of recycling heat is insufficient or faulted.

FIG. 3 and FIG. 4, depict the expansive section 400B of the system producing the energy to drive the compressive section 400A of the system. However, the expansive section 400B of the system may be eliminated and instead driven by a motor 110 or the like, as illustrated in FIG. 1. Use of the expansive section 400B however, may increase the efficiency of the distillation system 400 (300 in FIG. 3) as it may be powered by readily available heat energy in the environment (e.g., solar heat captured by solar panels, mirrors, or solar heat accumulated in the attic of houses, etc).

Additionally, on days when the sun is not strong enough to provide the boiler 360 with sufficient energy to fully drive the compressor 422, external energy may be applied to augment the work of the expander 370. The external energy may be in the form of a motor 110 (or other energy source), coupled to the expander 370 and/or the compressor 422. In the augmentation configuration, the expander 370 may derive its energy partially from a solar source and the remaining portion from an external augmenting motor.

Example 1 is an illustration of a mechanical advantage system in which the fluid 351A, 351B is refrigerant R-410A and is being used in the expansive section 400B to drive the compressive section 400A to distill water. The boiler 360 contains gas-phase and liquid phase mixture of the refrigerant R-410 351A. Evaporator 425 contains seawater and condenser 410 contains condensed or the resultant distilled water 440. For the purpose of this illustration, it is assumed that seawater and pure water have the same boiling points.

The following example assumes a starting temperature in the evaporator 425 to be 212 F.° and that all of the heat is circulated back into the system 400.

Example 1

Chart 1 lists the parameters to be applied to the systems illustrated in FIG. 3 or FIG. 4.

CHART 1

| Water | | |
|---|---|---|
| Condenser 410: | Temperature 222 F.° | Pressure 18 PSI (denoted by P1) |
| Evaporator 425: | Temperature 212 F.° | Pressure 14.69 PSI (denoted by P2) |
| R-410A | | |
| Boiler 360: | Temperature 80 F.° | Pressure 236 PSI (denoted by P3) |
| Condenser 380: | Temperature 70 F.° | Pressure 201.5 PSI (denoted by P4) |

Utilizing the parameters listed in Chart 1 and if A2=1 unit:

$$A1(P1-P2)=A2(P3-P4) \qquad \text{Equation 1:}$$

Compressive Expansive $$A1(18-14.69)PSI=A2(236-201.5)PSI.$$

$$(A1)3.31 \text{ PSI}=34.5 \text{ PSI}$$

$$A1=10.42 \text{ sq.in.}$$

Note: A1 and A2 is the area that partitions the difference in pressure acting upon compressor 422 and expander 370 respectively. At equilibrium there is a mechanical advantage of 10.42. If the area of displacement is proportional to the volume of displacement, then for every cubic meter of R410-A vapor displaced by the expander 370, 10.42 cubic meters are displaced by the compressor 422.

If the compressor displaces 10.42 times the volume of the expander, then:
P1V1=P2V2 or Work 1=Work 2
Work 1 compresses and Work 2 expands
or 3.31 PSI (10.42 cubic meters)=34.5 PSI (1 cubic meter)
34.5 PSI (cubic meter)=34.5 PSI (cubic meter)
If the temperature of evaporator 306/425 is 212 F.° then the density of steam at this temperature is 0.590 Kg/cubic meter: There is a yield of: 10.42 (0.590 Kg/cubic meter) =6.14 Kg of water for every cubic meter of R410-A displaced by the expander 370.

A relatively small temperature difference of 10 F.°, between the temperature of the ambient air and that of the ocean water, is required to operate the system. In this example, this temperature difference between the ambient air and the ocean water may be readily obtained naturally from the environment.

However, if the parabolic reflector or reflective mirrors 362 or other sources were utilized to provide additional heat to the boiler 360, much greater yields may be produced.

For example, if the temperature of the boiler 360 was raised by 10 F.° to a temperature of 90 F.°, utilizing similar calculations as those performed in Example 1, a yield of 12.97 Kg of water for every cubic meter of R410-A displaced by the expander 370 would be obtained.

Compared to the boiler being at 80 F.°, producing a yield of 6.14 Kg/cubic meter, the boiler at 90 F.° produces a yield of 12.97 Kg/cubic meter. The yield has more than doubled. Alternatively, the option of utilizing a motor 110 as shown in FIG. 1 or a combination of a motor 110 and an expansive section 400B to operate the compressive section 400A may be implemented.

Creating a Heat Loop

Assuming that most of the heat was recycled and there was minimal heat loss in the compressive section 400A of the system, the compressive section 400A would be assumed to be a closed loop system. When the expander 370 drives the compressor 422, energy is introduced into the closed loop as the compressor 422 increases the temperature of the steam 437 in the condenser 410. If the recycling mechanism was efficient enough, most of the heat would return back into the compressive section 400A, including the heat that was introduced by the expander 370. Theoretically, the temperature of the evaporator 425 would eventually increase and hence increase the temperature of the entire compressive section 400A. This is taking into consideration that the energy introduced by the expander 370 becomes incorporated into part of the total heat contained in the compressive section 400A.

If both the seawater 426 in the evaporator 425 and the condensed water 220 was at a temperature of 212 F.° and assumed to contained the same amount of internal heat and that if all the heat was recycled back into the loop, the only energy needed to run the process would be that of raising the temperature level of the steam 436 from the evaporator 425 just high enough so that the steam 437 may condense and give-off heat back to the cooler seawater 426 in the evaporator 425.

Insulation is of great importance in minimizing heat loss. An effective method of insulation is that of encasing the components of the compressive section 400A and creating a vacuum between the components and encasing. This would function much like that of a thermos.

All heat exchange elements may be comprised of coils, radiators, tube convolutions or the like to increase surface area for the purpose of achieving optimum heat exchange.

The introduction of external energy, into the heat loop by pumping the inflow of seawater 210 to elevated pressures into the evaporator 306/425 also becomes recycled. The pump 306B steps-up the system by increasing the pressure in the evaporator 306/425 and elevating the starting temperature in which the seawater 426 boils (see FIG. 3). The expander 370, driving the compressor 304/422, is now able to compress the steam 436 from the stepped-up evaporator 425 into a proportionally higher pressure and temperature into the condenser 410/307/308. The steam 437 within the condenser 410 is then able to transfer heat, at a higher temperature level, back into the evaporator 425, thus maintaining the stepped-up temperature of the evaporator 425. Heat, if required, may be applied to the seawater in the evaporator 425 to maintain or stabilize the system.

Salt Removal from the Evaporator

In order to preserve heat, the salt that becomes concentrated in the evaporator 425 may be expelled with the use of a second counter current heat exchange system. However, in this second counter current application the outgoing salt water 441 leaving evaporator 425 has much more salt concentrated than the incoming seawater 442. As the high salt-concentrated water 426 of evaporator 425 is being replaced with the less-concentrated incoming seawater 442, the salt level of the salt water 426 in evaporator 425 becomes less concentrated. Similarly, as previously illustrated in the counter current heat exchange system 200 in FIG. 2, the outgoing salt water 441 may be encircled by the incoming seawater 442 and in the process the incoming seawater 442 absorbs the heat from the outgoing salt water 441, thereby recycling and preserving heat. Furthermore, the seawater 426 in evaporator 425 may be allowed to concentrate to the point the concentrated salt precipitates out of solution and settles to the bottom. The precipitated salt may then be pumped out.

Figure 5A:
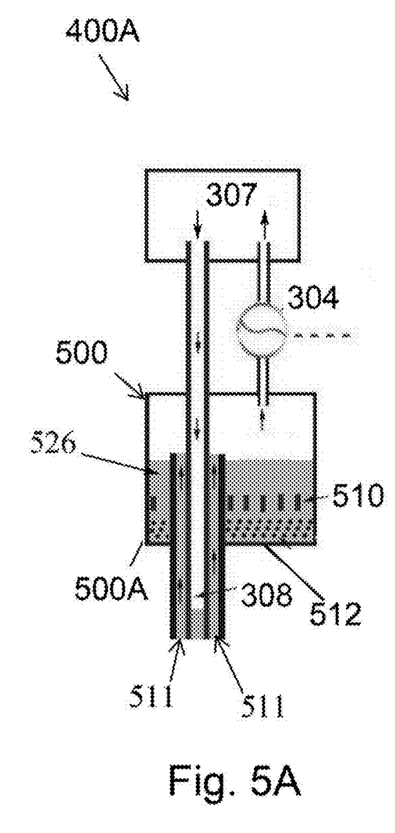
FIG. 5A illustrates a partial diagram of a distillation system having an evaporator with a plurality of vertical blades, according to an embodiment.

FIG. 5A illustrates a partial diagram of a distillation system having an evaporator with a plurality of vertical blades, according to an embodiment.

A series of vertical blades 510 may be placed across the lower portion of evaporator 500, allowing the precipitated salt to pass between the vertical blades 510 and settle onto a tray 512 located at the bottom 500A of evaporator 500.

Figure 5B:
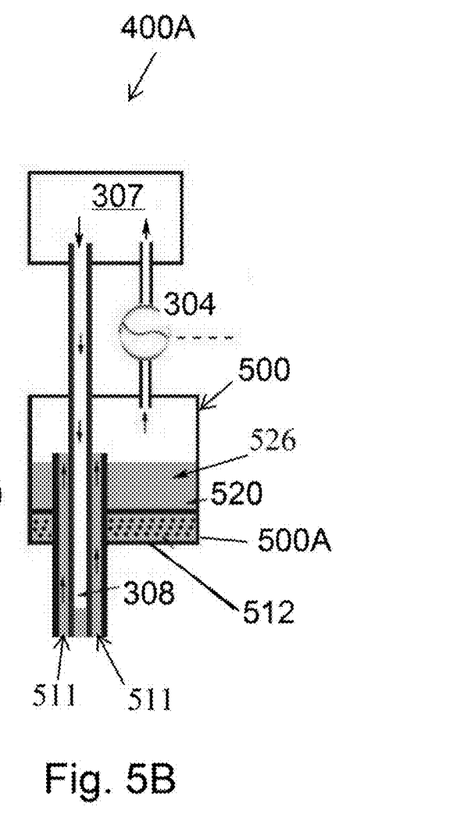
FIG. 5B illustrates a partial diagram of a distillation system having an evaporator with a plurality of horizontal blades, according to an embodiment.

FIG. 5B illustrates a partial diagram of a distillation system having an evaporator with a plurality of horizontal blades, according to an embodiment.

When the tray 512 becomes filled with salt, the tray 512 is then compartmentalized as the vertical blades 510 rotate horizontally and create a partition separating the tray 512 from the seawater 526 contained in evaporator 500. Once compartmentalized, the tray 512 may be removed from the bottom 500 A of evaporator 500 and emptied of its precipitated salt content. The empty tray 512 is then placed back into the bottom of evaporator 500 and the horizontal blades 520 resume their vertical position. The intake of seawater 511 is pumped to a higher level than the seawater 526 contained in evaporator 500 to avoid the back flow of the concentrated seawater 526.

Seawater containing higher concentrations of salt has higher boiling temperatures. However, this is of less significance if the heat is recycled and returned back through the loop. It is noted that the particular parameters utilized in these examples are for illustrative purposes, and an array of different parameters and types of refrigerants may be utilized that may produce similar or improved results.

Overview of the Process

The boiler 360 contains a gas-phase and a liquid-phase mixture of refrigerant R-410A 351A and absorbs heat from any available source including ambient heat, sun panels or parabolic reflectors 362. In this particular illustration the temperature of the refrigerant R-410A 351A—in the boiler 360 is 80 F.° and pressure is 236 PSI. The refrigerant R-410A being utilized in this example is for illustrative purposes only, any other refrigerant or liquid may be utilized in its place.

Condenser 380 transforms gas-phase refrigerant 351A to liquid-phase refrigerant 351B and gives-off heat to the cool incoming piped seawater 381. The temperature in condenser 380 containing R-410A is 70 F.° and the pressure is 201 PSI.

Evaporator 425 contains seawater 426 to be distilled. The temperature of the seawater 426 in evaporator 425 is 212 F.° and the pressure is 14.69 PSI.

Condenser 410 is located within evaporator 425. The steam 437 in condenser 410 condenses into pure water 440 as it gives-off heat to the seawater 426 in evaporator 425. The temperature in condenser 410 containing steam 437 is 222 F.° and the pressure is 18 PSI.

The compressor 422 draws steam 436 from the seawater 426 contained in evaporator 425 and compresses it into condenser 410. The temperature of the seawater in evaporator 425 is 212 F.° and the temperature of the steam 437 in condenser 410 is 222 F.°. Condenser 410 is located within evaporator 425, and concurrently, heat is reabsorbed from condenser 410 back to the seawater 426 in evaporator 425. In this manner latent heat becomes recycled as the latent heat is given-off from condenser 410 and absorbed by the evaporator 425.

Example 2 is an illustration showing a decrease in the level of mechanical advantage when water is utilized on the expansive section 400B, instead of R410A. Taking for example the parameters of chart 1 and instead of using R-410A on the expansive section 400B, R-410A is replaced with water. All temperature parameters remain the same as depicted in example 1 and listed in chart 1. However, both the compressive section 400A and the expansive section 400B of the system use water.

Example 2

Use of Water as the Refrigerant

Chart 2 lists the parameters to be applied in the system illustrated in FIG. 3 and FIG. 4.

CHART 2

Water

| | | |
|---|---|---|
| Condenser 410 | Temperature 222 F.° | Pressure 18 PSI (denoted by P1) |
| Evaporator 425 | Temperature 212 F.° | Pressure 14.69 PSI (denoted by P2) |
| Boiler 360 | Temperature 80 F.° | Pressure .507 PSI (denoted by P3) |
| Condenser 380 | Temperature 70 F.° | Pressure .363 PSI (denoted by P4) |

Utilizing the parameters listed in Chart 1 and if A2=1 unit:

Note: A is the area that partitions and interphases the difference of pressure.

$$A1(P1-P2)=A2(P3-P4) \quad \text{Equation 2:}$$

Compressive Expansive $$A1(18-14.69)PSI=A2(0.507-0.363)PSI.$$

$$(A1)3.31 \text{ PSI}=0.144 \text{ PSI}$$

$$A1=0.043 \text{ in.}$$

At equilibrium there is a mechanical advantage of 0.043.

For every cubic meter of water vapor displaced by the expander 370, 0.043 cubic meters of water vapor are displaced by the compressor 304/422.

If the compressor 304/422 displaces 0.043 times the volume of the expander 370, then:

P1V1=P2V2 or Work1=Work2

Work 1 compresses and Work 2 expands or 3.31PSI(0.043 cubic meters)=0.144 PSI(1 cubic meter)

0.144PSI (cubic meter)=0.144 PSI (cubic meter)

If the temperature of the evaporator is 212 F.° then the density of steam at this temperature is 0.590 Kg/cubic meter. There is a yield of 0.043 (0.590 Kg/cubic meter)=0.025 Kg of water vapor for every cubic meter of water vapor displaced by the expander 370.

However, when utilizing R410-A in the expansive section 400B, as in example 1, it produces a much higher yield (6.14 Kg of water/cubic meter) when compared to the yield utilizing water (0.025 Kg of water/cubic meter). Utilizing R410-A in the expansive section 400B produces (6.14 kg/.025 Kg=245.6) or 245.6 times greater yields than if water were to be utilized in the expansive section 400B.

As illustrated above, utilizing water in the expansive section 400B of this system would be impractical given that the pressure difference between the boiler 360 and the condenser 380 yields a force of only 0.144 PSI. The force acting upon the expander 370 is minimal and not sufficient to operate the system. In contrast when utilizing R410A in the expansive section 400B of this system, the pressure between the boiler 360 and the condenser 380 yields a force of 34.5 PSI.

However, the system is not intended to preclude the use of water as a refrigerant, in that water may be the refrigerant of choice in some applications. In a mechanical advantage system, utilizing two fluids having different vapor pressure properties at given parameters of temperature to produce a mechanical advantage, will be termed a chemically induced mechanical advantage. In contrast, a mechanical advantage is produced by a mechanical advantage system when the expander 370 and the compressor 304/422 simultaneously displaced a different volume of fluid. In some applications, it is advantages to use a mechanical advantage in combination with a chemically induced mechanical advantage to achieve a desired outcome.

Example 3

Example 3 illustrates that distillation systems produce greater yields with increased temperature of the seawater 426 in evaporator 306/425. In this example the temperature of the seawater 426 in evaporator 425 is 281 F.° and the temperature of the condenser 410 is 291 F.°. Chart 3 lists the parameters to be applied in the system illustrated in FIG. 3 and FIG. 4. The parameters for the expansive section 400B remain the same as those listed in chart 1. The parameters for the compressive section 400A have been increased. However, the condenser 410 and evaporator 425 on the compressive section 400A of both chart 1 and chart 3 have a temperature difference of 10 F.

CHART 3

Water

| | | |
|---|---|---|
| Condenser 410 | Temperature 291 F.° | Pressure 58 PSI (denoted by P1) |
| Evaporator 425 | Temperature 281 F.° | Pressure 50 PSI (denoted by P2) |

R-410A

| | | |
|---|---|---|
| The Boiler 360 | Temperature 80 F.° | Pressure 236 PSI (denoted by P3) |
| Condenser 380 | Temperature 70 F.° | Pressure 201.5 PSI (denoted by P4) |

Utilizing the parameters listed in Chart 3 and if A2=1, then:

$$A1(P1-P2)=A2(P3-P4)$$

Compressive Expansive $$A1(58-50)PSI=A2(236-201.5)PSI. \quad \text{Equation 3:}$$

$$(A1)8PSI=34.5 \text{ PSI}$$

$$A1=4.31 \text{ sq.in.}$$

Note: A1 and A2 is the area that partitions the difference in pressure in the compressor 304/422 and expander 370 respectively. At equilibrium a mechanical advantage of 4.31 is produced.

If the area of displacement is proportional to the volume of displacement, then for every cubic meter of R410-A vapor displaced by the expander 370, 4.31 cubic meters are displaced by the compressor 304. If the temperature of the evaporator 306 is 281 F.° then the density of steam at this temperature is 1.90 Kg/cubic meter:

When the temperature of the seawater 426 in evaporator 306/425 is at a temperature of 281 F.°, there is a yield of: 4.31 (1.90 Kg/cubic meter)=8.19 Kg of water for every cubic meter of R410-A displaced by the expander 370. This is a greater yield than that in example 1 producing a yield of 6.14 Kg/cubic, when the seawater 426 temperature of evaporator 306/425 is at 212 F.°.

Example 4

Use of the Expander to Power the System

Example 4 reduces the volume displacement of the compressor 304, illustrated in example 1, by 20%. The compressor 304 initially having a volume displacement of 10.42 (Cubic meter) PSI, now has a reduced volume displacement of 10.42 (0.20)=8.33 (Cubic meter).

Using this new parameter in equation 1, the expansive section 300A of the system will over power the compressive section 300B of the system and will have 6.9 (Cubic meter) PSI of available work to drive the compressive section 300B. The derivation is as follows:

$$P1V1=P2V2 \text{ or } Work1=Work2$$

Work 1=compressor and Work 2=expander $$8.33(3.31)=1(34.5) \quad \text{Equation 4}$$

27.57 (Cubic meter)PSI<34.5 (1 Cubic meter) PSI 34.5 (1 Cubic meter) PSI−27.57 (1 Cubic meter) PSI=6.9 (Cubic meter) PSI.

The expander 370 has 6.9 (Cubic meter) PSI of surplus work available to operate the compressor 304. The surplus work overcomes the friction of compressor 304, 422 and expander 370, and allow the system to run, stand alone, or without the need of external augmented energy. The greater the surplus energy the greater the power and speed to run compressor 304,422.

The illustrations previously discussed are only examples and the principles may also apply to other applications and scenarios utilizing different refrigerants, mechanical ratios, temperature and pressure parameters, etc.

Heat Containment System

Figure 6:
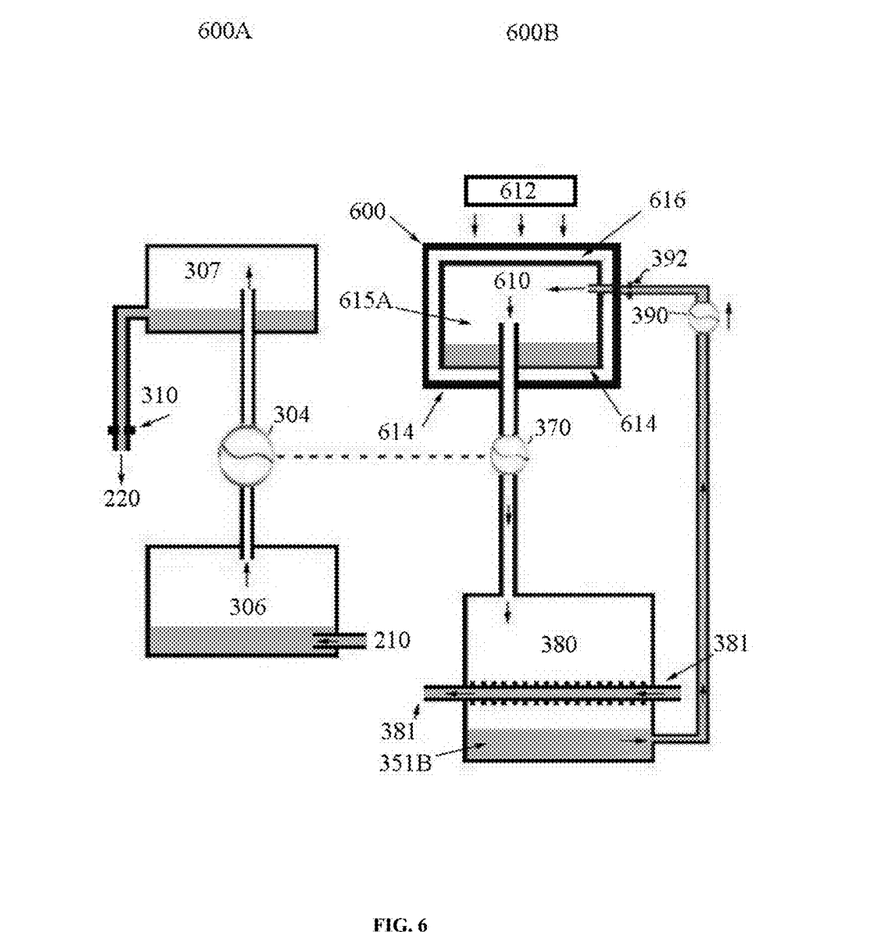
FIG. 6 illustrates a one way heat system.

FIG. 6 illustrates a heat containment system 600 for the expansive section 600B of the distillation system.

Typically boilers that collect heat from sun radiation, lose heat to the environment through conduction. This embodiment helps prevent such loss. Sun rays from parabolic reflectors or mirrors 612 or the like penetrate the encasement 614, heating the boiler 610 of the expansive section 600 and causing the refrigerant 615 A to boil. Sun rays are electromagnetic radiation carrying heat. And, since electromagnetic waves are not impeded by a vacuum, heat may be transferred via radiation through vacuum layer 616 and both encasements 614 and heat the refrigerant 615A of boiler 610.

As radiant energy contacts the refrigerant 615A, its energy is transformed into kinetic energy and heats the refrigerant 615A. The heat in the form of kinetic energy contained in boiler 610 becomes trapped and unable to escape to the outside as the kinetic energy of the heated refrigerant 615 A molecules is unable to penetrate and pass the vacuum barrier. The vacuum barrier 616 acts as a thermal insulator similar to that of a thermos. In utilizing this system, radiation energy is allowed to enter boiler 610 but the transformed kinetic energy, from the radiation, is prevented from escaping outside boiler 610. The heat containment system helps prevents heat loss to outside the boiler 610 and forces the energy to pass through expander 370 as useful work.

The encasement 614 may be composed of transparent materials, or other materials capable of allowing the penetration of radiation or sun rays. It is noted that some electromagnetic radiation may reflect and leave the system.

The energy derived from the expansive section 600B, utilizing the one way heat system 600 may be implemented as a power source to operate any of the pre-mentioned compressive sections 100, 300B, 400A and 600A.

FIG. 6 illustrates the one way heat system 600 used in conjunction with an expander 370 of the expansive section 600B. The energy derived from the expansive section 600B is a power source for operating compressor 304. This embodiment, however, illustrates that the condenser 307 may be placed externally from evaporator 306 and not necessarily being limited to being placed within evaporator 306. In this situation the heat given off by condenser 307, including the heat of condensation, is absorbed by its environment rather than evaporator 306.

The one way heat system is not intended to be restricted for use as described in this disclosure but may be useful in other applications such as the use of boilers to power steam generators or applications where it is desired to capture radiant energy and preclude kinetic energy from escaping.

Much of the heat utilized by the system is recycled. As previously discussed, the heat recycling embodiments are summarized as follows:

1) Positioning condenser 410 within evaporator 425 causing latent heat to be given-off by condenser 410 and absorbed by the 425 evaporator.
2) Placing the condensing probe 140 deep into a tube containing the incoming seawater 152 causing heat to be absorbed by the seawater 142.
3) Utilizing a counter current heat exchange 200 for the transfer of heat from the hot condensed water 220 emitted from the condenser 135 and condensing probe 140 to the incoming seawater 210, such that most of the heat of the condensed water 220 is transferred to the incoming seawater 210.

4) Diverting low grade heat, in the form of condensed water 220, away from the counter current heat exchange 200 and delivering it into the boiler 360. The diverted low grade heat of the condensed water 220 conducts heat to the liquid-phase refrigerant R410-A 351A contained in boiler 360, causing the liquid refrigerant R410-A 351A to boil in the boiler 360, thus helping to power the expander 370.

5) Utilizing a pre-warming system to warm incoming seawater from the sea by transferring heat from the condenser 380 to the seawater before it enters the holding reservoir 230.

6) Placing the piped outflow and storage containers 223 of condensed water 220 within the intake reservoir of the seawater, allowing the residual heat from the condensed seawater to transfer to the seawater in the holding reservoir 230.

It is noted that the major principles of recycling heat are generally described herein and that there may exist variants or deviations that produce an equivalent outcome. It is the purpose of the present invention to encompass these variations. All embodiments may be implemented solely or in conjunction with any combination with one another thereof.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A system of distillation, comprising:
a compressive section and an expansive section, said compressive section comprises an evaporator, a compressor, and a first condenser,
wherein, said evaporator receives a first fluid and boils received said first fluid and produces a first vapor,
said first vapor is then compressed by said compressor into said first condenser such that the temperature of compressed first vapor is higher than the temperature of said evaporator, further
said first condenser is placed within said evaporator and as said first vapor condenses into a condensate of said first vapor, heat is given off and absorbed by said first fluid in said evaporator, causing said first fluid to boil; and
wherein said expansive section, acts as a power source, and
said expansive section contains a second fluid and further comprises an expander which said expander is in communication with a boiler and a second condenser,
wherein, said boiler is configured to absorb heat from said boiler surroundings, and generate a gas-phase from a liquid-phase of said second fluid, resulting in an increase in pressure in said boiler; and
said second condenser is configured to expel heat to said second condenser surroundings, and generate a liquid-phase from a gas-phase of said second fluid, resulting in a decrease in pressure in said second condenser,
wherein, the resultant difference in pressure between said boiler and said second condenser drives said expander, and thus, said compressor to which said expander is connected, and
wherein there is a difference between the vapor properties of said first fluid used in said compressive section and said second fluid used in said expansive section, such that said difference induces a mechanical advantage between said expander and said compressor,
the system further comprising a pump for delivery of the liquid phase of said second fluid from said second condenser to said boiler,
wherein said first fluid contained in said first condenser is comprised of at least one member of a group consisting of said first vapor and said condensate of said first vapor,
directing at least one member of the group consisting of said first vapor and said condensate of said first vapor emerging from said first condenser into said boiler of said expansive section for heating said second fluid and causing said second fluid to boil, thereby contributing energy to said boiler to drive said expander and thus said compressor of said compressive section.

2. The system of distillation according to claim 1, wherein said second fluid is a refrigerant.

3. The system of distillation according to claim 1, wherein energy is augmented by use of a motor to drive said compressor of said compressive section.

4. The system of distillation according to claim 1, wherein said boiler receives solar energy from parabolic reflectors.

5. The system of distillation according to claim 1, wherein at least one reflective mirror provides radiant heat to heat said second fluid of said boiler.

6. The system of distillation according to claim 1, wherein a heating element provides heat to said first fluid of said evaporator.

7. The system of distillation according to claim 1, wherein a salt content of said first fluid in said evaporator becomes increasingly concentrated due to boiling of said first fluid and forms precipitated salt; further a plurality of vertical blades submerged in the boiling portion of said saltwater first fluid and placed across a bottom portion of said evaporator above the precipitated salt, allowing the precipitated salt to pass between the said vertical blades and settle onto a tray, and when said tray becomes filled with the precipitated salt, said tray is then compartmentalized as said vertical blades rotate horizontally and create a partition separating said tray from said salt water first fluid, said tray is configured to be emptied of a contents and placed back into an original position.

8. The system of distillation according to claim 1, wherein a system for enhancing a rate of vaporization of said second fluid in said boiler comprises said pump for pressurizing liquid phase of said second fluid from said second condenser to said boiler to a level sufficiently higher than a pressure of said boiler, and as said second fluid is emitted through an expansion valve in a form of a spray into said boiler a drop in pressure causes increased vaporization of said second fluid.

9. The system of distillation according to claim 1, wherein said second condenser receives at least one line of cooled said first fluid that extends through said second condenser where expanded gas phase of said second fluid warms the at least one line of said first fluid as said expanded gas phase of said second fluid gives off heat during a process of condensation, thus pre warming said said first fluid prior to entering said evaporator of said compressive section.

10. The system of distillation according to claim 1, in a heat containment application, wherein said boiler containing said second fluid, and comprising an encasing encapsulating said boiler and a vacuum disposed within said encasing, wherein said encasing allows energy in a form of radiation to penetrate said encasing and said vacuum layer, thus reaching said second fluid, and thus, the radiation in said broiler transforms its energy into a kinetic energy as it heats and boils said second fluid contained in said boiler, further heat in the form of said kinetic energy is incapable of penetrating and passing through said vacuum layer, thus preventing the loss of the heat to the outside of said boiler resulting in a greater energy efficiency to drive said expander.

11. A system of distillation, comprising:
a compressive section and an expansive section, said compressive section comprises an evaporator, a compressor, and a first condenser,
wherein, said evaporator receives a first fluid and boils received said first fluid and produces a first vapor,
said first vapor is then compressed by said compressor into said first condenser such that the temperature of compressed first vapor is higher than the temperature of said evaporator, further
said first condenser is placed within said evaporator and as said first vapor condenses into a condensate of said first vapor, heat is given off and absorbed by said first fluid in said evaporator, causing said first fluid to boil; and
wherein said expansive section, acts as a power source, and
said expansive section contains a second fluid and further comprises an expander which said expander is in communication with a boiler and a second condenser,
wherein, said boiler is configured to absorb heat from said boiler surroundings, and generate a gas-phase from a liquid-phase of said second fluid, resulting in an increase in pressure in said boiler; and
said second condenser is configured to expel heat to said second condenser surroundings, and generate a liquid-phase from a gas-phase of said second fluid, resulting in a decrease in pressure in said second condenser,
wherein, the resultant difference in pressure between said boiler and said second condenser drives said expander, and thus, said compressor to which said expander is connected, and wherein there is a difference between the vapor properties of said first fluid used in said compressive section and said second fluid used in said expansive section, such that said difference induces a mechanical advantage between said expander and said compressor,
the system further comprising a pump for delivery of the liquid phase of said second fluid from said second condenser to said boiler,
wherein said first fluid contained in said first condenser is comprised of at least one member of a group consisting of said first vapor and said condensate of said first vapor,
a condensing probe as an extension of said first condenser, further said first fluid emerging from said first condenser comprised of at least one member of a group consisting of said first vapor and said condensate of said first vapor, from said first condenser in which said first fluid transfers heat to incoming said first liquid destined to said evaporator, said condensing probe containing said first liquid is positioned within said evaporator and extends into a counter current heat exchange relationship with incoming first liquid flowing to said first evaporator, said incoming first liquid encase and encircles said condensing probe, and said first liquid contained in said condensing probe flows in an opposite direction from the incoming said first liquid flowing into said evaporator, further pumping the liquid phase of said second fluid from said second condenser to said boiler.

12. The system of distillation according to claim 11 wherein, said second fluid is a refrigerant.

13. The system of distillation according to claim 11, wherein at least a portion of said first fluid emerging from said first condenser is piped into said boiler of said expansive section for heating said second fluid and causing said second fluid to boil, thereby contributing energy to said boiler to drive said expander and thus said compressor of said compressive section.

14. The system of distillation according to claim 11, wherein at least a portion of said first fluid emerging from said first condenser and received by said condensing probe is piped from said condensing probe into said boiler of said expansive section for heating said second fluid and causing said second fluid to boil, thereby contributing energy to said boiler to drive said expander and thus said compressor of said compressive section.

15. The system of distillation according to claim 11, wherein said first fluid is comprised of at least one member of a group consisting of seawater and of unpurified water and said first vapor is steam.

* * * * *